United States Patent [19]

Williams et al.

[11] Patent Number: 5,200,096
[45] Date of Patent: Apr. 6, 1993

[54] METHOD OF INHIBITING CORROSION IN ACIDIZING WELLS

[75] Inventors: Dennis A. Williams; Phyllis K. Holifield; James R. Looney; Lee A. McDougall, all of Houston, Tex.

[73] Assignee: Exxon Chemicals Patents, Inc., Linden, N.J.

[21] Appl. No.: 768,060

[22] Filed: Sep. 27, 1991

[51] Int. Cl.$^5$ .................... E21B 43/07; C11D 7/48; C23F 11/16

[52] U.S. Cl. .................. 252/8.553; 252/8.552; 252/8.555; 252/8.551; 166/279; 166/304; 166/307; 166/902

[58] Field of Search ............... 252/8.555, 8.553, 8.552, 252/8.551; 166/279, 304, 307, 902

[56] References Cited

U.S. PATENT DOCUMENTS

| | | | |
|---|---|---|---|
| 3,738,789 | 4/1969 | Jones | 252/8.553 |
| 3,773,465 | 11/1973 | Keeney et al. | 252/389 |
| 3,962,101 | 6/1976 | Crowe | 166/307 X |
| 4,028,268 | 6/1977 | Sullivan et al. | 252/392 |
| 4,498,997 | 2/1985 | Walker | 252/8.553 |
| 4,522,658 | 6/1985 | Walker | 252/8.553 X |
| 4,522,672 | 12/1985 | Walker | 252/8.553 |
| 4,737,296 | 4/1988 | Watkins | 252/8.553 |
| 4,882,075 | 11/1989 | Jones | 252/8.553 |
| 4,997,040 | 3/1991 | Cizek | 166/307 |
| 5,034,140 | 7/1991 | Gardner et al. | 252/8.553 |
| 5,058,678 | 10/1991 | Dill et al. | 252/8.553 X |
| 5,120,471 | 6/1992 | Jasinski et al. | 252/389.54 |

Primary Examiner—Robert L. Stoll
Assistant Examiner—C. Sayala
Attorney, Agent, or Firm—R. L. Graham

[57] ABSTRACT

Corrosion inhibitor additives are added directly to an aqueous acid solution used in acidizing subterranean formations. The additives comprise a bismuth compound, a quaternary compound, and a surfactant. The corrosion inhibitor is free of toxic Sb and acetylenic compounds.

9 Claims, No Drawings

METHOD OF INHIBITING CORROSION IN ACIDIZING WELLS

BACKGROUND OF THE INVENTION

This invention relates generally to corrosion inhibitors and more specifically to the use of corrosion inhibitors containing quaternary/bismuth complex in acid solutions used in treatment of subterranean formations. In one aspect, the invention relates to the direct addition of the corrosion inhibitor additives to the aqueous acid solution used in well acidizing.

DESCRIPTION OF THE PRIOR ART

Acids and acid solutions have long been used in the stimulation of oil wells, gas wells, water wells, and similar boreholes. Acid stimulation is performed in wells completed in subterranean formations. Acidizing is used in conjunction with hydraulic fracturing techniques and matrix acidizing techniques. In both acid fracturing and matrix acidizing, the well treating acid solutions, usually HCl, HF, or mixtures thereof, are pumped through the well tubular goods and injected into the formation where the acid attacks formation materials increasing its permeability to oil and/or gas.

In order to protect the equipment and tubular goods from the corrosive effects of the acid, the well treating acid almost always includes a corrosion inhibitor.

Corrosion inhibitors of diverse description and composition have been proposed over the years for use with well treating acids. Corrosion inhibitors that have received wide spread use are those containing metal/quaternary ammonium complexes. Some of these are described in the following U.S. Pat. Nos.: 3,773,465 (cuprous iodide); 4,498,997; 4,522,658; and 4,552,672 (antimony compounds).

The cuprous complexes are of limited utility since they do not provide satisfactory protection at 300 degrees Fahrenheit and above.

A problem associated with the use of antimony is its toxicity. Moreover, the antimony complexes are used with acetylenic alcohol which is also toxic. There, accordingly, is the need for a nontoxic metal that complexes with the quaternary compounds for use in acid systems without acetylenic alcohol.

SUMMARY OF THE INVENTION

The method of the present invention employs bismuth compounds for complexing with quaternary compounds in the acid. The low toxicity of Bi, coupled with the fact that the system is free of Sb and acetylenics, results in an environmentally safe corrosion inhibitor.

It has been discovered that for the corrosion inhibitors containing Bi/quaternary complexes by direct addition to the acid to be effective, the acid corrosion inhibitor (ACI) system must be carefully prepared. The ACI system for protecting steel tubulars must contain the following additives which are individually added to the acid systems.
(a) bismuth compound;
(b) quaternary compound capable of forming a complex with Bi ions; and
(c) surfactant that matches the type and strength of the acid and steel tubular goods.

For most acid systems the choice of surfactant depends on the strength of HCl or HCl/HF employed. For example, at 20% HCl the surfactant may have a hydrophilic-Lipophilic balance (HLB) from 1 to about 16. However, as acid strength reduces, the surfactant must be more and more "oil loving"; that is the HLB must become lower and lower. Tests have shown the following relationship exists for acid strength and the HLB of the surfactant:

(a) The acid solutions must contain between 7½ to 20% HCl or for mud acid 21% HCl. Systems outside this range do not work regardless of the surfactant;
(b) For solutions containing 15 to 24% total acid, the HLB must range from 1 to 16;
(c) For solutions containing less than 15% total acid down to 10% total acid, the HLB must range from 1 to 3.5; and
(d) For solutions containing less than 10% total acid, the HLB must range from greater than 1 to less than 3 (preferably 2 to 2.5).

Tests have also demonstrated that the in situ generation of ACI's of the present invention in both HCl and mud acid systems, without Sb or acetylenic alcohols, are effective and are low in toxicity, making them far safer than the Sb containing ACI's.

Surprisingly, it has been found that the bismuth containing corrosion inhibitor additives described above, when added directly to the aqueous acid solution, exhibits excellent dispersion and gives satisfactory acid corrosion protection comparable with conventional corrosion inhibitor containing toxic antimony and acetylenic alcohol.

The concentrations of the three additives in the acid solution are as follows:

| COMPONENT | BROAD RANGE (wt %) | PREFERRED RANGE (wt %) | MOST PREFERRED RANGE (wt %) |
|---|---|---|---|
| Bismuth Compound | .10 to 4.0 | .2 to 2.0 | .4 to 1.4 |
| Quaternary Compound | 0.2 to 10 | 0.4 to 5.0 | 0.4 to 2.2 |
| Surfactant | 0.1 to 25 | 0.1 to 5.0 | 0.1 to 1.5 |

Generally, the component ranges are interchangeable. For example, the most preferred range of a metal component may be used with both the broad and preferred ranges of the other components.

The corrosion inhibitor components are separately introduced into the well treating acid at a concentration sufficient to coat the well tubulars and equipment. The concentration of each component in the acid solution should generally be sufficient to provide the acid solution with from 0.10 wt % to 4.0 wt % of Bi compound, or from 0.09 to 3.5 wt % of the Bi ion.

The method of the present invention provides effective corrosion high temperature protection associated with metal salt complexes and employs low toxicity additives (e.g., surfactant, quaternary, and Bi) which are separately dispersible in the aqueous acid solution. The method of the present invention offers the operational advantage of direct addition and dispersion in the acidizing solution without preformulation. The corrosion inhibitors with acetylenic compounds of the prior art generally required solvents and premixture of at least some of the components.

DESCRIPTION OF PREFERRED EMBODIMENTS

As indicated above, the method of the present invention employs three additives which combine in situ when added to a well treating acid solution to provide effective corrosion inhibition. Each of these compounds as well as the acid solution in which they are used are described below.

Aqueous Acid Solutions: Any of the common oil field acids (e.g., HCl systems and mud acid systems) may be used. These are referred to herein as "well treating acids" and include aqueous solutions of hydrochloric acid (HCl), hydrofluoric acid (HF) and mixtures of HCl and HF (i.e., mud acid). The HCl acids useable in the method of the present invention include those containing from 7½ to 20% HCl. The mud acids useable in the method of the present invention include those containing from 9 to 21% HCl and from 1 to 6% HF. All percentages for the additives recited herein are by wt. unless otherwise indicated.

Bismuth Compounds: The function of the bismuth is to complex with the quaternary ammonium compound and form a protective deposit on the metal tubulars and equipment.

The preferred bismuth compounds are the salts such as BiCl3, or BiOCl and the oxide (Bi2O3) which is converted to BiCl3, or BiOCl upon addition to the acid.

The bismuth compound may comprise, for example, bismuth trichloride, bismuth triiodide, bismuth trifluoride, alkali metal salts of bismuth tartrate, bismuth adducts of ethylene glycol, and bismuth trioxide or any other trivalent bismuth compound and the like. As mentioned above, the bismuth oxides may be converted to halide salts in the presence of aqueous acid.

Quaternary Compounds: The quaternary ammonium compounds (referred to as "quaternary" herein) employed in the present invention must be capable of complexing with the bismuth ions. The preferred quaternary comprise aromatic nitrogen compounds which may be illustrated by alkyl pyridine-N-methyl chloride quaternary alkyl pyridine-N-benzyl chloride quaternary, quinoline-N-methyl chloride quaternary, quinoline-N-benzyl chloride quaternary, quinoline-N-(chloro-benzyl chloride) quaternary, isoquinoline quaternaries, benzoquinoline quaternaries, chloromethyl naphthalene quaternaries, chloromethyl naphthalene quinoline quaternaries, and admixtures of such compounds, and the like. The most preferred quaternaries are those containing a benzyl group. These have proven effective in weak HCl solutions (7.5–10%). The quaternary compound and Bi may be used in molar ratios of 1:1 to 5:1. Generally, the quaternary compound, because of its higher molecular weight, will be present in the acid solution at a higher concentration than the metal compound. The weight ratios of the quaternary compound and the Bi preferably range from 1:1 to 4:1.

The Surfactant: The surfactant serves to wet the tubular goods to permit deposition of the quaternary/metal complex. The preferred surfactants are nonionics having hydrophilic-lipophilic balance (HLB) numbers which must be tailored to fit the acid strength being pumped into the well. The relationship of HLB to acid concentration may be expressed as a Ratio of the HLB/wt % acid. This relationship for most systems is as follows:

(a) For acid solutions containing from 15 to 20% HCl, the Ratio ranges from 0.050 to 0.80; and (b) For acid solutions containing less than 15% HCl (e.g., 12%, 10%, and 7.5%), the Ratio ranges from 0.25 to 0.33.

Nonionic surfactants include the polyoxyethylene surfactants (such as ethoxylated alkyl phenols, ethoxylated aliphatic alcohols) polyethylene glycol esters of fatty, resin, and tall oil acids. Examples of such surfactants are polyoxyethylene alkyl phenol wherein the alkyl group is linear or branched C8-C12 and contains above about 40-50 wt % polyoxyethylene. Octyl and nonyl phenols containing 6 to 12 moles ethylene oxide per mole hydrophobe are the preferred ethoxylated alkyl phenol surfactants.

The polyoxyethylene ester of fatty acids include the mono and dioleates and sesquioleates wherein the molecular weight of the esterified polyethylene glycol is between about 200 and 1000. Polyoxyethylene sorbitan oleates are also useable.

In addition to the above, ethoxylated nonylphenol/formaldehyde resins and ethoxylated polypropylene glycol coupled with diglycidyl ether of Bisphenol A are useful. Also ethoxylated fatty amines were found useful.

Operation: In operation, the three additives described above are added to the aqueous acid solution at the well site. The additives may be added in any order but preferably are in the following order: (1) surfactant; (2) bismuth compound; and (3) quaternary compound. The concentration of quaternary/metal complex in the acid solution should preferably provide a bismuth compound concentration of a least 0.10 wt %.

The procedure for preparing the inhibited acid for pumping down the well is preferably by a batch process. In this process, the additives are blended into the aqueous acid solution in a large tank and then pumped into the well.

It has been found that the direct addition of the additives requires only a few minutes for dispersion and complexing to occur, so that any pumping process including the continuous process may be employed. The batch process, however, is preferred because it assures adequate conditioning of the corrosion inhibitor in the acid prior to pumping.

The method of the present invention can be used in wells to protect tubular goods made of typical oil field tubular carbon steels such as J-55, N-80, P-105, and the like; or made of high alloy chrome duplex steels such as Cr-9, Cr-13, Cr-2205, Cr-2250, and the like.

EXPERIMENTS

In order to demonstrate the effectiveness of the corrosion inhibitor additives added directly to the acid solution, several samples were tested using various components. The additives used in the tests were as follows.

Surfactants

1. Nonylphenol/formaldehyde resin with 10 moles ethylene oxide per phenol residue. The HLB value is about 3.
2. Nonylphenol/formaldehyde resin with 11.5 moles ethylene oxide per phenol residue. The HLB is about 3.5.
3. PPG, chain extended with diglycidyl ether of bisphenol A and oxyakylated with ethylene oxide and propylene oxide. The HLB is about 1.
4. Nonylphenol with 10 moles ethylene oxide. The HLB is 13.4.

5. Nonylphenol with 20 moles ethylene oxide. The HLB is 16.
6. Polyoxythylene (23) lauryl ether, HLB is about 16.9.
7. Polyethoxylated (5) octadecylamine, HLB is about 8-9.
8. Proprietary blend sold by Callaway Chemical, HLB is 10.
9. Polyethoxylated (5) castor oil, HLB about 4.4

BISMUTH COMPOUND (a) $BiCl_3$
(b) $Bi_2O_3$ (this reacts with HCl to form BiOCl, $BiCl_3$ or $HBiCl_4$ depending on HCl acid strength)

Quaternary Compounds

X Sixty percent benzyl/quinoline quaternary.
Y Sixty percent alpha-chloromethylnapthalene/ quinoline quaternary.

Acids

1. HCl acid was prepared at strengths of 28 24 22,20, 15, 12, 10, and 7.5 wt %.
2. HCl/HF acid was prepared at strengths of 22.5/1.5, 21/3, 18.5/1.5, 17/3, 13.5/1.5, 12/3, 10/1.5, 9/3, 7.5/1.5, 6/3. and 6/1/2.

The procedure for preparing the aqueous acid solution with inhibitor additives and test procedure was as follows:
(1) The appropriate acid strength was prepared by dilution of 37% HCl with deionized water and where required with the addition of ammonium bifluoride.
(2) To 100 ml of aqueous acid were added the surfactant, the bismuth compound, and the ammonium quaternary compound.
(3) The coupons (N-80 steel or Cr-2205) were then put in the acid solution with the additives and heated to 350 degrees Fahrenheit under 3,000 psi for four hours.
(4) The coupons were then removed and cleaned, the weight loss measured, and the corrosion rate calculated.

Three series of tests were carried out:
1. Series I tested the effect of acid strength on corrosion rates using N-80 steel coupons. (Table I data).
2. Series II tested the effect of the surfactant on corrosion rates using N-80 steel coupons. (Table II data).
3. Series III tested the effect of the surfactant at various acid strengths on corrosion rates using CR-2205 coupons. (Table III data).

The effect of acid strength on the usefulness of this corrosion inhibitor package is illustrated in TABLE I. Acid strength is varied from 28 wt % HCl down to 6 wt % HCl/1.5 wt % HF. For simple HCl acid, the $Bi_2O_3$/Quaternary/Surfactant system works well with Surfactant 2 (HLB is 3.5) from 12 to 20 wt % HCl. For the HCl/HF acid systems, the effective concentration are from 9/3 (12% total acid) to 21/3 (24% total acid) wt % HCl/HF. Changing the quaternary compound from X to Y had no effect and changing the surfactant concentration only, had no effect.

TABLE I

| QUAT. TYPE | AMT. | ACID | SURF. TYPE | HLB | AMT. | Bi | AMT. | CORR. RATE LB/SQ. FT. | Protection |
|---|---|---|---|---|---|---|---|---|---|
| X | 2 ml | 28 | 2 | (3.5) | .4 ml | b | 1 gm. | 1.1681 | No |
| X | 2 ml | 25/3 | 2 | (3.5) | .4 ml | b | 1 gm. | 1.2326 | No |
| X | 2 ml | 24.0 | 2 | (3.5) | .4 ml | b | 1 gm. | 1.1731 | No |
| X | 2 ml | 22.5/1.5 | 2 | (3.5) | .4 ml | b | 1 gm. | 1.3319 | No |
| X | 2 ml | 22.0 | 2 | (3.5) | .4 ml | b | 1 gm. | 1.0206 | No |
| X | 2 ml | 21/3 | 2 | (3.5) | .4 ml | b | 1 gm. | 0.0091 | Yes |
| Y | 2 ml | 20.0 | 2 | (3.5) | 1 ml | b | 1 gm. | 0.0089 | Yes |
| X | 2 ml | 20.0 | 2 | (3.5) | 1 ml | b | 1 gm. | 0.0184 | Yes |
| X | 2 ml | 20 | 2 | (3.5) | .4 ml | b | 1 gm. | 0.0054 | Yes |
| X | 2 ml | 18.5/1.5 | 2 | (3.5) | .4 ml | b | 1 gm. | 0.0041 | Yes |
| X | 2 ml | 17/3 | 2 | (3.5) | .4 ml | b | 1 gm. | 0.0036 | Yes |
| Y | 2 ml | 15.0 | 2 | (3.5) | 1 ml | b | 1 gm. | 0.0101 | Yes |
| X | 2 ml | 15.0 | 2 | (3.5) | 1 ml | b | 1 gm. | 0.0169 | Yes |
| X | 2 ml | 15 | 2 | (3.5) | .4 ml | b | 1 gm. | 0.0058 | Yes |
| X | 2 ml | 13.5/1.5 | 2 | (3.5) | .4 ml | b | 1 gm. | 0.0027 | Yes |
| X | 2 ml | 12/3 | 2 | (3.5) | .4 ml | b | 1 gm. | 0.0031 | Yes |
| X | 2 ml | 12.0 | 2 | (3.5) | .4 ml | b | 1 gm. | 0.0182 | Yes |
| X | 2 ml | 10/1.5 | 2 | (3.5) | .4 ml | b | 1 gm. | 0.0134 | Yes |
| Y | 2 ml | 10.0 | 2 | (3.5) | 1 ml | b | 1 gm. | 0.5796 | No |
| X | 2 ml | 10.0 | 2 | (3.5) | 1 ml | b | 1 gm. | 0.5931 | No |
| X | 2 ml | 09/3 | 2 | (3.5) | .4 ml | b | 1 gm. | 0.0184 | Yes |
| X | 2 ml | 07.5/1.5 | 2 | (3.5) | .4 ml | b | 1 gm. | 0.5094 | No |
| Y | 2 ml | 07.5 | 2 | (3.5) | 1 ml | b | 1 gm. | 0.2739 | No |
| X | 2 ml | 07.5 | 2 | (3.5) | 1 ml | b | 1 gm. | 0.4275 | No |
| X | 2 ml | 07.5 | 2 | (3.5) | .4 ml | b | 1 gm. | 0.4275 | No |
| X | 2 ml | 06/3 | 2 | (3.5) | .4 ml | b | 1 gm. | 0.4184 | No |
| X | 2 ml | 06/1.5 | 2 | (3.5) | .4 ml | b | 1 gm. | 0.4304 | No |

TABLE II illustrates the effect of various surfactants on the usefulness of the Bi/quaternary complex in various acid systems with N-80 coupons. Above 24 wt % total acid, the complex was not effective in controlling acid corrosion. From 15% to 24% total acid, surfactants with HLB's between about 1 to about 16 were found to work well. For less than 15% HCl, the high HLB surfactants were found to be less effective. Those surfactants with HLB's below 3.5 gave good results. At 10% HCl, Surfactant 1 gave acceptable results and it has a HLB of about 3. For 7½% HCl, combinations of Surfactants with HLB's of 2-2.5 were found effective.

TABLE II

| QUAT. TYPE | AMT. | ACID | SURF. TYPE | HLB | AMT. | Bi | AMT. | CORR. RATE LB/SQ. FT. | PROTECTION |
|---|---|---|---|---|---|---|---|---|---|
| X | 2 ml | 28.0 | 2 | (3.5) | .4 ml | b | 1 gm. | 1.1681 | No |

TABLE II-continued

| QUAT. TYPE | AMT. | ACID | SURF. TYPE | HLB | AMT. | Bi | AMT. | CORR. RATE LB/SQ. FT. | PROTECTION |
|---|---|---|---|---|---|---|---|---|---|
| X | 2 ml | 25/3 | 2 | (3.5) | .4 ml | b | 1 gm. | 1.2326 | No |
| X | 2 ml | 24.0 | 2 | (3.5) | .4 ml | b | 1 gm. | 1.1731 | No |
| X | 2 ml | 22.5/1.5 | 2 | (3.5) | .4 ml | b | 1 gm. | 1.3319 | No |
| X | 2 ml | 22.0 | 2 | (3.5) | .4 ml | b | 1 gm. | 1.0206 | No |
| X | 2 ml | 21/3 | 2 | (3.5) | .4 ml | b | 1 gm. | 0.0091 | Yes |
| X | 2 ml | 20.0 | 5 | (16) | 1 ml | b | 1 gm. | 0.0372 | Yes |
| Y | 2 ml | 20.0 | 5 | (16) | 1 ml | b | 1 gm. | 0.0054 | Yes |
| Y | 2 ml | 20.0 | 4 | (13.4) | 1 ml | b | 1 gm. | 0.0063 | Yes |
| X | 2 ml | 20.0 | 4 | (13.4) | 1 ml | b | 1 gm. | 0.0061 | Yes |
| X | 2 ml | 20.0 | 3 | (1) | 1 ml | b | 1 gm. | 0.0303 | Yes |
| Y | 2 ml | 20.0 | 3 | (1) | 1 ml | b | 1 gm. | 0.0988 | Yes |
| Y | 2 ml | 20.0 | 2 | (3.5) | 1 ml | b | 1 gm. | 0.0089 | Yes |
| X | 2 ml | 20.0 | 2 | (3.5) | .4 ml | b | 1 gm. | 0.0054 | Yes |
| X | 2 ml | 20.0 | 2 | (3.5) | 1 ml | b | 1 gm. | 0.0184 | Yes |
| Y | 2 ml | 20.0 | 1 | (3) | 1 ml | b | 1 gm. | 0.0061 | Yes |
| X | 2 ml | 20.0 | 1 | (3) | 1 ml | b | 1 gm. | 1.0517 | No |
| X | 2 ml | 18.5/1.5 | 2 | (3.5) | .4 ml | b | 1 gm. | 0.0041 | Yes |
| X | 2 ml | 17/3 | 2 | (3.5) | .4 ml | b | 1 gm. | 0.0074 | Yes |
| X | 2 ml | 17/3 | 2 | (3.5) | .4 ml | b | 1 gm. | 0.0036 | Yes |
| X | 2 ml | 17/3 | 2 | (3.5) | .4 ml | b | 1 gm. | 0.0039 | Yes |
| Y | 2 ml | 15.0 | 5 | (16) | 1 ml | b | 1 gm. | 0.8261 | No |
| X | 2 ml | 15.0 | 5 | (16) | 1 ml | b | 1 gm. | 0.8682 | No |
| Y | 2 ml | 15.0 | 4 | (13.4) | 1 ml | b | 1 gm. | 0.0355 | Yes |
| Y | 1 ml | 15.0 | 3/2 | (2) | .4/.4 ml | b | 1 gm. | 0.0315 | Yes |
| Y | 1 ml | 15.0 | 3/2 | (2) | .4/.4 ml | b | 1 gm. | 0.0306 | Yes |
| Y | 2 ml | 15.0 | 3 | (1) | 1 ml | b | 1 gm. | 0.0296 | Yes |
| X | 2 ml | 15.0 | 2 | (3.5) | 1 ml | b | 1 gm. | 0.0169 | Yes |
| Y | 2 ml | 15.0 | 2 | (3.5) | 1 ml | b | 1 gm. | 0.0101 | Yes |
| X | 2 ml | 15.0 | 2 | (3.5) | .4 ml | b | 1 gm. | 0.0058 | Yes |
| Y | 1 ml | 15.0 | 7/6 | (3.5) | .2/.3 ml | b | 1 gm. | 0.5318 | No |
| X | 2 ml | 15.0 | 1 | (3) | 1 ml | b | 1 gm. | 0.0212 | Yes |
| Y | 2 ml | 15.0 | 1 | (3) | 1 ml | b | 1 gm. | 0.0169 | Yes |
| X | 2 ml | 13.5/1.5 | 2 | (3.5) | .4 ml | b | 1 gm. | 0.0027 | Yes |
| Y | 1 ml | 12/3 | 3/2 | (2.2) | .4/.4 ml | b | 1 gm. | 0.0128 | Yes |
| X | 2 ml | 12/3 | 2 | (3.5) | .4 ml | b | 1 gm. | 0.0031 | Yes |
| Y | 1 ml | 12/3 | 7/6 | (12.7) | .2/.2 ml | b | 1 gm. | 0.0074 | Yes |
| X | 2 ml | 12.0 | 2 | (3.5) | .4 ml | b | 1 gm. | 0.0182 | Yes |
| X | 2 ml | 09/3 | 2 | (3.5) | .4 ml | b | 1 gm. | 0.0184 | Yes |
| X | 2 ml | 10/1.5 | 2 | (3.5) | .4 ml | b | 1 gm. | 0.0134 | Yes |
| X | 2 ml | 10.0 | 5 | (16) | 1 ml | b | 1 gm. | 0.5921 | No |
| X | 2 ml | 10.0 | 5 | (16) | 1 ml | b | 1 gm. | 0.5943 | No |
| Y | 2 ml | 10.0 | 4 | (13) | 1 ml | b | 1 gm. | 0.5826 | No |
| X | 2 ml | 10.0 | 4 | (13) | 1 ml | b | 1 gm. | 0.4557 | No |
| X | 2 ml | 10.0 | 3 | (1) | 1 ml | b | 1 gm. | 0.4523 | No |
| Y | 2 ml | 10.0 | 3 | (1) | 1 ml | b | 1 gm. | 0.5892 | No |
| Y | 2 ml | 10.0 | 2 | (3.5) | 1 ml | b | 1 gm. | 0.5796 | No |
| X | 2 ml | 10.0 | 2 | (3.5) | 1 ml | b | 1 gm. | 0.5931 | No |
| Y | 2 ml | 10.0 | 1 | (3) | 1 ml | b | 1 gm. | 0.5821 | No |
| X | 2 ml | 10.0 | 1 | (3) | 1 ml | b | 1 gm. | 0.0523 | Yes |
| X | 2 ml | 07.5/1.5 | 2 | (3.5) | .4 ml | b | 1 gm. | 0.5094 | No |
| Y | 1 ml | 07.5 | 9 | (4.3) | 1 ml | b | 1 gm. | 0.3443 | No |
| Y | 1 ml | 07.5 | 8 | (10) | 1 ml | b | 1 gm. | 0.3693 | No |
| Y | 1 ml | 07.5 | 7/6 | (13.7) | .2/.3 ml | b | 1 gm. | 0.3615 | No |
| X | 4 ml | 07.5 | 3/2/1 | (2.5) | .95/.95/.8 ml | b | 2 gm. | 0.0406 | Yes |
| X | 4 ml | 07.5 | 3/1 | (2) | .95/.95 ml | b | 2 gm. | 0.0409 | Yes |
| X | 2 ml | 07.5 | 3/1 | (2) | .95/.95 ml | b | 1 gm. | 0.0451 | Yes |
| X | 4 ml | 07.5 | 3/1 | (2) | .95/.95 ml | b | 1 gm. | 0.0355 | Yes |
| X | 2 ml | 07.5 | 2 | (3.5) | 1 ml | b | 1 gm. | 0.4275 | No |
| Y | 2 ml | 07.5 | 2 | (3.5) | 1 ml | b | 1 gm. | 0.2739 | No |
| X | 2 ml | 07.5 | 2 | (3.5) | .4 ml | b | 1 gm. | 0.4285 | No |
| X | 2 ml | 07.5 | 1 | (3) | 1 ml | b | 1 gm. | 0.4275 | No |
| Y | 2 ml | 07.5 | 1 | (3) | 1 ml | b | 1 gm. | 0.3861 | No |
| X | 2 ml | 06/3 | 2 | (3.5) | .4 ml | b | 1 gm. | 0.4184 | No |
| X | 2 ml | 06/1.5 | 2 | (3.5) | .4 ml | b | 1 gm. | 0.4304 | No |

TABLE III illustrates the effects of both acid strength and surfactant on the usefulness of the Bi/-Quaternary complex with chrome alloy steel. High HLB and low HLB surfactants were compared as well as combination of surfactants. Above 15% total acid both types of surfactants failed to give satisfactory results. For 15% HCl and 12/3 mud acid, both worked well. Below 12/3 mud acid or 12% HCl, both types failed to give satisfactory results.

TABLE III

| QUAT. TYPE | AMT. | ACID | SURF. TYPE | HLB | AMT. | Bi | AMT. | CORR. RATE LB/SQ. FT. | PROTECTION |
|---|---|---|---|---|---|---|---|---|---|
| X | 2 ml | 22 | 5 | (16) | .4 ml | b | 1 gm. | 1.0325 | No |
| X | 2 ml | 20 | 2 | (3.5) | .4 ml | b | 1 gm. | 0.9547 | No |
| X | 2 ml | 18.5/1.5 | 5 | (16) | .4 ml | b | 1 gm. | 1.1007 | No |
| X | 2 ml | 17/3 | 5 | (16) | .4 ml | b | 1 gm. | 1.1348 | No |

TABLE III-continued

| QUAT. TYPE | AMT. | ACID | SURF. TYPE | HLB | AMT. | Bi | AMT. | CORR. RATE LB/SQ. FT. | PROTECTION |
|---|---|---|---|---|---|---|---|---|---|
| X | 2 ml | 17/3 | 2 | (3.5) | .4 ml | b | 1 gm. | 0.4242 | No |
| Y | 2 ml | 15 | 5 | (16) | .6 ml | b | 1 gm. | 0.0059 | Yes |
| X | 2 ml | 15 | 5 | (16) | .4 ml | b | 1 gm. | 0.0091 | Yes |
| X | 2 ml | 15 | 2 | (3.5) | .4 ml | b | 1 gm. | 0.0121 | Yes |
| X | 2 ml | 15 | 2 | (3.5) | .4 ml | b | 1 gm. | 0.0178 | Yes |
| X | 2 ml | 13.5/1.5 | 5 | (16) | .4 ml | b | 1 gm. | 0.0296 | Yes |
| Y | 3 ml | 12/3 | 5/3/1 | (4.1) | .1/.1/.8 ml | b | 1 gm. | 0.0967 | Marg. |
| X | 3 ml | 12/3 | 5/3/1 | (4.6) | .1/.1/.5 ml | b | 1 gm. | 0.2631 | No |
| X | 2 ml | 12/3 | 5 | (16) | .4 ml | b | 1 gm. | 0.1099 | Marg. |
| X | 3 ml | 12/3 | 3/1 | (2) | .2/.2 ml | b | 1 gm. | 0.0102 | Yes |
| Y | 3 ml | 12/3 | 3/1 | (2) | .1/.1 ml | b | 1 gm. | 0.0531 | Marg. |
| Y | 3 ml | 12/3 | 3/1 | (2) | .2/.2 ml | b | 1 gm. | 0.0795 | Marg. |
| X | 3 ml | 12/3 | 3/1 | (2) | .1/.1 ml | b | 1 gm. | 0.0121 | Yes |
| X | 2 ml | 12/3 | 2 | (3.5) | .4 ml | b | 1 gm. | 0.0279 | Yes |
| X | 2 ml | 12 | 5 | (16) | .4 ml | b | 1 gm. | 0.1345 | No |
| X | 2 ml | 10 | 5 | (16) | .4 ml | b | 1 gm. | 0.4995 | No |
| X | 2 ml | 07.5 | 5 | (16) | .4 ml | b | 1 gm. | 0.3954 | No |
| X | 2 ml | 07.5 | 2 | (3.5) | .4 ml | b | 1 gm. | 0.3159 | No |
| X | 2 ml | 06/3 | 5 | (16) | .4 ml | b | 1 gm. | 0.5352 | No |
| X | 2 ml | 06/1.5 | 5 | (16) | .4 ml | b | 1 gm. | 0.4561 | No |
| X | 2 ml | 06/1.5 | 2 | (3.5) | .4 ml | b | 1 gm. | 0.3569 | No |

Tests have shown that acid corrosion inhibitors in acid systems containing 10% or less HCl were not effective in protecting chrome alloys.

The above laboratory experiments demonstrate the criticalilty in adjusting the surfactant to a particular acid system. It is this discovery that enables a low toxic metal Bi to be successfully adapted for commercial acidizing operations. The Sb ACI's do not exhibit the dependence on the surfactant HLB.

What is claimed is:

1. In a method of acidizing a subterranean formation penetrated by a borehole which has metal pipe positioned therein comprising:
   (a) selecting an aqueous acid solution selected from the group consisting of 7.5% to 20% HCl and mud acid containing from 9 to 21% HCl;
   (b) adding separately to the acid solution the following additives to form a corrosion inhibitor in said acid solution;
      (i) from 0.10 to 4.0 wt % of a bismuth compound;
      (ii) from 0.2 to 10 wt % of a quaternary ammonium compound capable of forming a complex with bismuth; and
   (c) adding to the acid solution from 0.1 to 25 wt % of a surfactant having an HLB of 1-16 for solutions containing from 15 to 24 wt % acid, and 1 to 5.5 for solutions containing less than 15% acid and not less than 10% acid, and greater than 1 and less than 3 for solutions containing less than 10 wt % acid; said acid solution being free of toxic acetylenic and antimony compounds; and
   (d) pumping the solution with the corrosion inhibitor down the pipe and into the formation.

2. The method of claim 1 wherein the bismuth is added in the form of Bi2O3 and reacts with the acid solution to form BiCl3 or BiOCl.

3. The method of claim 1 wherein the concentration of the bismuth compound in the aqueous acid solution is between 0.20 wt % and 2.0 wt %.

4. The method of claim 1 wherein the aqueous acid is mud acid and wherein the surfactant has an HLB of 3 to 16.0.

5. The method of claim 4 wherein the pipe is made of high alloy chrome steel and the acid solution is selected from the group consisting of about 15% HCl and about 12-15%/1-6% HCl/HF mixture.

6. The method of claim 1 wherein the surfactant is nonionic having an HLB no. between 1 and 16.

7. The method of claim 1 wherein the metal pipe is made of carbon steel.

8. A method of acidizing a subterranean formation penetrated by a well having carbon steel positioned therein, which comprises:
   (a) selecting an aqueous solution of 7.5 to 20% HCl in a tank;
   (b) adding separately to the aqueous acid solution corrosion inhibitor additives comprising:
      (i) from 0.20 to 2.0 of a bismuth compound;
      (ii) from 0.4 to 5.0 wt % of a quaternary ammonium compound capable of forming a complex with the bismuth; and
      (iii) from 0.1 to 5.0 wt % of a nonionic surfactant having an HLB No. of 1 to 16 in 10-20% HCl and 1-3.5 in 71/2% to less than 10% HCl; and wherein the inhibited acid solution is substantially free of antimony and acetylenic compounds; and
   (c) pumping the aqueous acid solution containing the corrosion inhibitor additives down the pipe and into the formation.

9. The method of claim 8 wherein the acid solution further includes from 1 to 6% HF and the surfactant has an HLB of 3 to 16.0.

* * * * *